United States Patent [19]

Schoch

[11] Patent Number: 4,611,690
[45] Date of Patent: Sep. 16, 1986

[54] BICYCLE WHEEL RIM BRAKE

[75] Inventor: Robert Schoch, Hilzingen, Fed. Rep. of Germany

[73] Assignee: Weinmann GmbH & Co., KG, Fed. Rep. of Germany

[21] Appl. No.: 593,898

[22] Filed: Mar. 27, 1984

[30] Foreign Application Priority Data

May 16, 1983 [DE] Fed. Rep. of Germany ....... 3317770

[51] Int. Cl.⁴ .............................................. B62L 3/02
[52] U.S. Cl. ................................. 188/24.11; 188/72.8
[58] Field of Search ................ 188/2 D, 24.11, 24.12, 188/24.14, 24.15, 24.16, 24.19, 24.21, 24.22, 26, 72.8, 24.13, 24.17, 24.18, 25, 27; 403/348, 349

[56] References Cited

U.S. PATENT DOCUMENTS 226,453 4/1880 Kelly ................................. 403/348 X
4,133,560 1/1979 Ishikawa et al. ................ 403/349 X

FOREIGN PATENT DOCUMENTS 8630 6/1983 European Pat. Off. ......... 188/24.22
2655699 6/1978 Fed. Rep. of Germany .
397413 1/1974 U.S.S.R. ............................ 188/24.21

Primary Examiner—Bruce H. Stoner, Jr.
Assistant Examiner—Richard R. Diefendorf
Attorney, Agent, or Firm—Learman & McCulloch

[57] ABSTRACT

A bicycle wheel rim brake having an actuating element which can be rotated against spring force is actuated via of a traction cable in such a way that a sliding member supporting a brake lining is displaced in a straight line at right angles to the rim. The axis of rotation of the actuating element coincides with the axis of displacement of the sliding member or lies parallel thereto. A control surface which is inclined relative to this axis of rotation is connected to the sliding member. The sliding member, the brake lining, and the actuating element are supported by a bearing housing which is retained by a bayonet catch in a recess in the wheel fork in such a way that the maintaining of the rim brake is extremely simple.

8 Claims, 6 Drawing Figures

BICYCLE WHEEL RIM BRAKE

The invention relates to a two-wheel rim brake, particularly for bicycles.

BACKGROUND OF THE INVENTION

A two-wheel rim brake of the type to which the invention relates is the subject matter of an earlier European Patent Application No. 82 110 473.4. In this rim brake the effective brake parts, that is, the sliding members with the brake linings and their actuating elements, can be retained directly on the frame or tube sections of the wheel fork lying immediately opposite the rim. The effective brake parts, which are of similar construction on either side of the rim, form compact units which can be of extremely space-saving construction. Because of the way the effective brake parts are assembled, they function in an extremely stable manner which leads to a sensitive and highly effective actuation of the brake in any weather conditions.

The object of the invention is to develop the known two-wheel rim brake further so as to provide a particularly simple fitting of the brake on the bicycle wheel fork.

SUMMARY OF THE INVENTION

The stated object is achieved according to the invention in that the bearing housing is retained in the recess in the wheel fork by means of a bayonet catch.

The construction according to the invention also makes use of the space-saving compact construction in which the principal effective brake parts, that is, the sliding members with the brake linings and their actuating elements located in the immediate proximity of the appertaining sliding member, are combined to form one assembly. Such an assembly can be inserted directly into a recess provided for such purpose on the wheel fork or the relevant tubular section of the wheel fork. The cooperating elements of the bayonet catch are provided on the one hand in the recess in the wheel fork and on the other hand on the bearing housing and they interengage in such a way that, when the assembly is mounted, the bearing housing is inserted in the recess in the wheel fork and by appropriate rotation can be brought into its fitting position in which the bearing housing is immovably received in the recess in the wheel fork and is retained there reliably. Such fixing by means of a bayonet catch also permits rapid removal of the assembly from the wheel fork if necessary for maintenance or repair work.

THE DRAWINGS

Further details and advantages of the invention are set out in the following description of one embodiment illustrated in the drawings, wherein.

DETAILED DESCRIPTION

Figure 1:
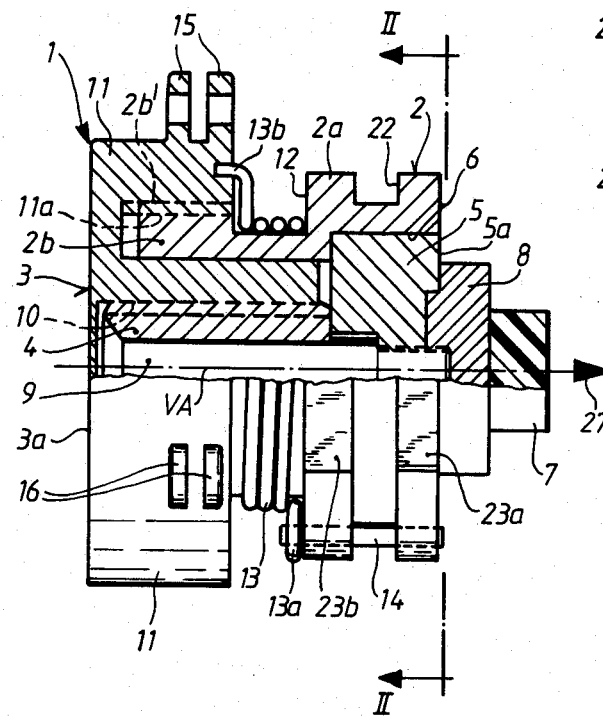
FIG. 1 is a view in partial longitudinal section of an assembly containing the effective brake parts.

The effective brake parts comprise an assembly 1 having a bearing housing 2, a threaded socket 3 which is arranged therein so as to be partially rotatable, a threaded spindle 4 which engages in the threaded socket 3, a sliding member 5 which is mounted on one axial end of the threaded spindle 4 and is received in a recess 6 in the bearing housing 2, and a brake lining 7 which is supported by a brake lining carrier 8 and is mounted by means of the latter on the end 5a of the sliding member facing one wheel rim of a cycle. The spindle 4, the sliding member 5 and the brake lining carrier 8 with the brake lining 7 can be connected one behind the other in the axial direction with the aid of a centrally arranged screw 9 and optionally by a serration (between the threaded spindle 4 and the sliding member 5) so as to be fixed against rotation and sliding. The sliding member 5 generally has a cross-section which deviates from a circular area and in the illustrated embodiment (FIG. 2) is approximately a pointed ellipse, and the cross-section of the recess 6 is adapted to that of the sliding member 5 so that the sliding member 5 can only be slid within the recess 6 but cannot be turned.

In practice the threaded spindle 4 also forms a part of the sliding member 5, namely, the part which is axially opposed to the brake lining 7. The treaded spindle 4 engages with its external thread in the internal thread of a central threaded bore 10 in the threaded socket 3. Therefore, if the threaded socket 3 is turned the threaded spindle 4 is forcibly displaced in the direction of the axis of displacement VA and thus the appertaining sliding member 5 with the brake lining carrier 8 which it supports and the brake lining 7 are forcibly displaced.

In the illustrated embodiment the bearing housing 2 has a first, inner housing section 2a and a second, outer housing section 2b. The sliding member 5 is axially slidable inside the first housing section and the threaded socket 3 is mounted inside the second housing section 2b so as to be rotatably and slidably movable. The threaded socket 3 has on its outer surface facing away from the rim or the brake lining 7 (on the left-hand side in FIG. 1) a collar 11 which engages over the second, outer section 2b of the bearing housing 2 and is provided with an internal thread 11a which engages with a thread 2b' provided on the outer periphery of the second housing section 2b. While the central threaded bore 10 and the threaded spindle 4 of the sliding member 5 have a relatively large thread pitch, the pitch of the internal thread 11a of the collar and the corresponding external thread 2b' of the bearing housing are considerably smaller.

Figure 6:
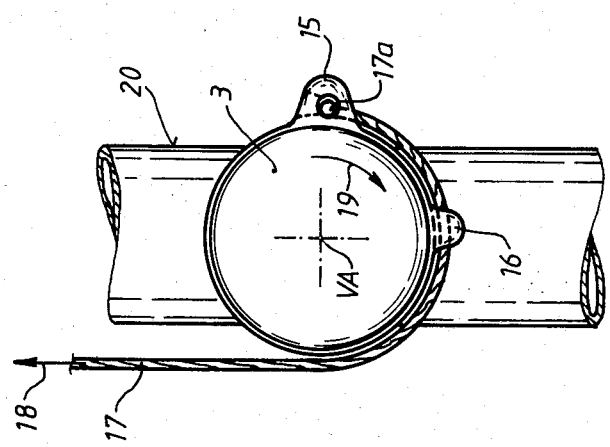
FIG. 6 is an elevational view taken in the direction of the arrow VI in FIG. 4.

A first annular groove 12 is constructed between the first, inner housing section 2a and the second, outer housing section 2b of the threaded socket collar 11 which is screwed thereon. A helical spring 13 is received in the annular groove 12 and has one end 13a fixed with the aid of a pin 14 on the first housing section 2a and the other end 13b fixed on the threaded socket collar 11. Mounted on the outer peripheral surface of the threaded socket collar 11 are on the one hand two fastening projections 15 and on the other hand two guide projections 16 which are offset from the fastening projections in the peripheral direction and are in the form of radially projecting tabs. A traction cable 17 shown in FIG. 6 is fixed with its end 17a on the fastening projections 15 and is guided around a part of the outer periphery of the collar 11 and held in position between the two guide projections 16 so that it cannot slip off.

The threaded socket 3 can be completely closed on its outer surface 3a facing away from the brake lining 7 (as shown in FIG. 1) and can thus at the same time form a sort of cover for the brake assembly 1.

The construction and arrangement of the threaded socket 3 with its outer collar 11 in this embodiment thus produce the actuating element by means of which the sliding member 5 is moved. Therefore, when the traction cable 17 is pulled in the direction of the arrow 18, for example by a Bowden wire, the threaded socket 3 rotates against the force of the helical spring 13 (in the direction of the arrow 19 in FIG. 6) in such a way that the threaded socket 3 moves a short distance axially relative to the fixed bearing housing 2. However, since the internal thread of the central threaded bore 10 has a substantially greater pitch than the internal thread 11a of the threaded socket collar 11, with this rotary movement of the threaded socket 3 the threaded spindle 4 and with it the appertaining sliding member 5 with the brake lining carrier 8 and the brake lining are displaced in the axial direction (axis of displacement VA). The automatic locking between the threads 11a and 2b' has the advantageous effect for the user that braking only requires a relatively little force since the user only needs to apply a little more force than is necessary to overcome the force of the retracting spring (a significant proportion of the braking force when the brake is applied, however, is absorbed by the thread 11a or 2b' between the threaded socket 3 and the bearing housing 2).

The construction of the brake assembly 1 as described above principally provides advantages for production. The individual parts of this assembly 1 can be made from any suitable material which is sufficiently stable; because of the favorable construction and the uniform transfer of force both the threaded socket 3 and the bearing housing 2 can be made from plastics material.

It will be understood that a bicycle will include a similar brake assembly 1 on both sides of the wheel rim. For this purpose a recess 21 (FIG. 3) is provided in the wheel fork of the bicycle or in each tubular section of the wheel fork opposite one another (aligned), and the bearing housing 2 which supports the sliding member 5, the brake lining 7, and the actuating element (threaded socket 3), and thus finally the whole brake assembly 1 are firmly retained in this recess.

The bearing housing 2 has on the outer periphery of its first, inner section 2a a peripheral groove 22 and—in the illustrated embodiment—two diametrically opposed milled out areas 23 which extend to the base of the groove and which can essentially be flattened areas running approximately tangentially to the base 22a of the groove. A lug 24 the peripheral length of which is at most as great as the peripheral length of the appertaining milled out area 23 projects from the inner peripheral surface of the recess 21 in the wheel fork to engage in the peripheral groove 22 and is associated with each of the milled out areas 23. The lugs 24 are preferably projections which are directed radially inwards and are constructed in one piece on the inner periphery of a substantially cylindrical bush 25 which is fixed, for example by welding, in the recess 21 in the wheel fork which is aligned at right angles to the rim 26 (see FIG. 4). The lugs 24 in the bush 25 together with the appertaining milled out areas and the peripheral groove 22 form a bayonet catch by means of which the bearing housing 2 is retained in the recess 21 in the wheel fork (see FIGS. 4 and 5).

Figure 3:
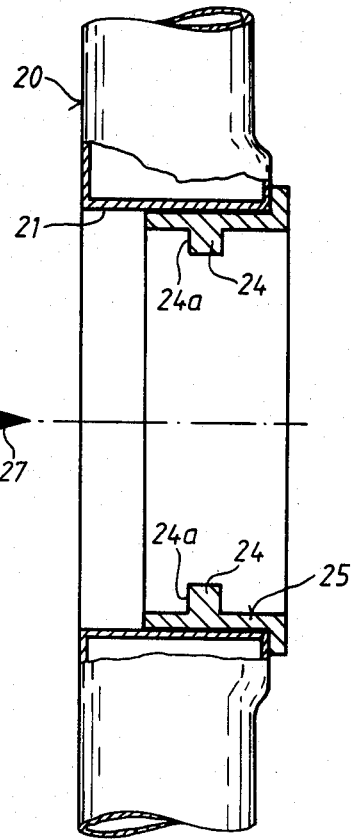
FIG. 3 is a partially sectional view of a tubular section of a wheel fork with the recess intended to receive the bearing housing.
Figure 2:
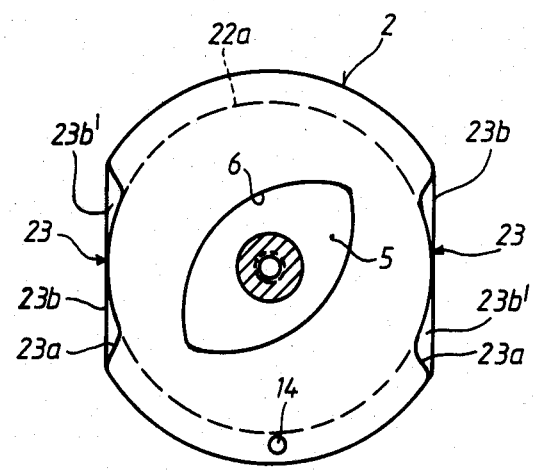
FIG. 2 is a sectional view of the brake assembly taken approximately along the line II—II of FIG. 1.
Figure 4:
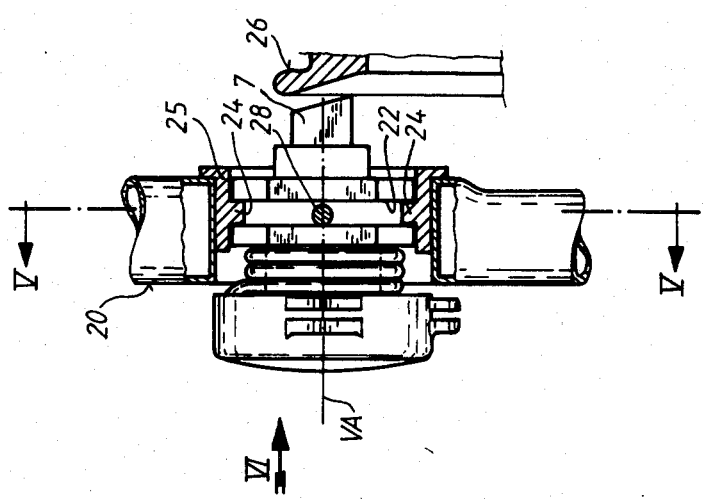
FIG. 4 is a partially sectional view of the wheel fork frame section with the fitted brake assembly.

In order to bring the brake assembly 1 shown in FIGS. 1 and 2 into its assembled condition according to FIG. 4, the brake assembly 1 with its bearing housing 2 is arranged relative to the recess 21 in the wheel fork in the manner shown in FIGS. 1 and 3, that is to say, in particular that the milled out areas 23 are arranged in such a way that they lie opposite the appertaining lugs 24 like a cover, and as a result the bearing housing 2 can be inserted into the recess 21 in the wheel fork or into the bush 25 fixed therein until the annular peripheral groove 22 is located exactly opposite the lugs 24 which fit into it. For this purpose the front sections 23a of the milled out areas 23 in the direction of insertion (arrow 27 in FIG. 1) can be machined out further—as shown in FIG. 2—than the rear sections 23b in the direction of insertion so that—as is clearly shown in FIG. 2—these rear sections 23b of the milled out areas form contact surfaces 23b' which come to rest against the end faces 24a of the lugs 24 facing them and thus limit movement of the bearing housing 2 into the bush 25. When the bearing housing 2 reaches this position in the bush 25 it is merely necessary for the bearing housing 2 to be turned in the direction of brake actuation (arrow 19 in FIG. 6) so that the milled out areas 23 are rotated in the peripheral direction relative to the lugs 24 and the bayonet catch reaches its closed position and the bearing housing 2 is in its fitting condition. The bearing housing 2 is turned by corresponding rotation of the whole brake assembly 1, and according to FIG. 5 this rotation can amount to approximately 90 degrees and be limited by a stop which in the illustrated embodiment is advantageously formed by the pin 14 which holds the helical spring 13 and passes through the peripheral groove 22 in the transverse direction (see FIG. 1). Any removal of the whole brake assembly 1 from the wheel fork (tubular section 20) which may be necessary for the purpose of maintenance or repair is carried out in the reverse manner by turning the bearing housing 2 against the direction of actuation (arrow 19 in FIG. 6) and thus bringing the milled out areas 23 and the extensions 24 into coincidence again; it is then sufficient simply to pull the bearing housing 2 out of the bush 25.

Figure 5:
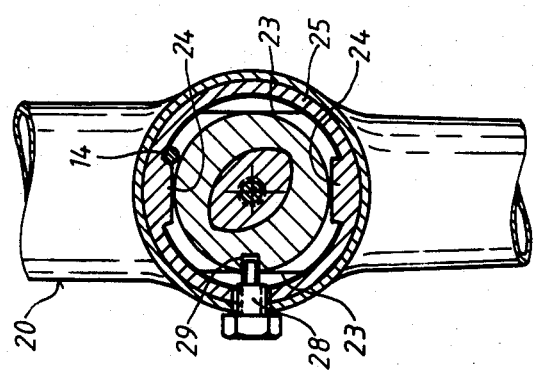
FIG. 5 is a sectional view taken on the line V—V oF FIG. 4.

When the brake is actuated by means of the traction cable 17 and thus when the threaded socket 23 is rotated the bearing housing 2 is always held in the closed position of the bayonet catch, and therefore reliable retention of the bearing housing 2 and with it the whole brake assembly 1 in the recess 21 in the wheel fork is ensured by simple means. However, the bearing housing 2 can also be additionally secured in its fixed position by means of an anchor or locking screw 28 inserted from the outer side of the wheel fork, as indicated in FIGS. 4 and 5, and this locking screw 28 can engage in a corresponding bore 29 in the bearing housing 2.

It has proved particularly advantageous to provide only two diametrically opposed milled out areas 23 and two correspondingly diametrically opposed lugs 24 to form the bayonet catch, but naturally more such milled out areas and lugs of matching arrangement and construction could be provided. In addition, the brake assembly with the bearing housing and the essential brake parts mounted therein do not necessarily have to be constructed in the manner shown in FIGS. 1 and 2, and variations thereof could be used such as those set out in particular in the various embodiments according to European Patent Application No. 82 110 473.4. In this connection it should be pointed out that the axis of displacement VA of the sliding member 5 in the illustrated embodiment coincides with the axis of rotation of the actuating element, but this axis of rotation of the actuating element can be displaced parallel to the axis of displacement of the sliding member.

I claim:

1. In a brake adapted for use with a bicycle wheel rim lying adjacent a bicycle frame and having:
   (a) a bearing housing;
   (b) a sliding member supported by said housing for linear reciprocating movements relative to said housing toward and away from said rim along an axis of displacement at right angles to the rim;
   (c) a brake lining carried by said sliding member at that end of the latter confronting said rim and extending beyond said housing for engagement with said rim;
   (d) a rotary actuating element carried by said housing and rotatable against the force of a spring about an axis substantially coincident with the axis of displacement of the sliding member, said actuating element being in threaded engagement with the sliding member; and
   (e) said bicycle frame having a recess therein adjacent said rim;
   (f) the improvement wherein said bearing housing is rotatably accommodated in said recess for rotary movements about said axis of displacement, said housing and said frame having cooperable bayonet catch parts for removably retaining said housing in said recess.

2. A brake according to claim 1 wherein the bearing housing is movable into and out of said recess and has a first, inner housing section on the outer periphery of which is a peripheral groove having a base defined by a pair of walls one of which confronts said first housing section, said one wall having at least two milled out areas which are peripherally offset relative to each other and extend approximately to the base of the groove, said frame supporting a lug projecting into said recess in a position to pass through at least one of said milled out areas and engage in the peripheral groove, the milled out areas and the peripheral groove forming the bayonet catch.

3. A brake according to claim 2 wherein said lug is carried by a substantially cylindrical bush accommodated in the recess.

4. A brake according to claim 3 wherein two of said lugs are diametrically opposed and project radially inwards from said bush, the milled out areas and the lugs being so coordinated that in fitting the bearing housing into said recess the milled out areas may be turned relative to the lugs in a direction toward a stop.

5. A brake according to claim 1 including a removable anchor screw acting between said frame and said bearing housing for assisting in retaining the latter in said recess.

6. In a brake adapted for installation in a recess formed in a bicycle frame member adjacent a wheel rim, said brake having a housing, one end of which is movable into and out of said recess, said housing also having an opposite end, a brake force applying member carried by said housing for movements along an axis of displacement toward and away from said rim, a rotary collar carried by said housing at its opposite end, means responsive to rotary movement in one direction of said collar for moving said brake force applying member along said axis toward said rim, means for rotating said collar in said one direction, and means for retaining said one end of said housing in said recess, the improvement wherein said retaining means comprises at least one lug extending radially inwardly of said recess, and an annular groove in said housing adjacent said one end thereof and defined by a pair of walls spaced apart a distance sufficient to accommodate said lug in said groove with one of said walls confronting said lug, said one wall having a relieved area sufficient to permit said lug to enter said groove when said lug and said relieved area are aligned, said housing being rotatable relative to said recess following the accommodation of said lug in said groove to a position in which said lug and said relieved area are misaligned, whereby said one end of said housing removably is retained in said recess.

7. A brake according to claim 6 including stop means for limiting rotation of said housing in said one direction.

8. A brake according to claim 6 including releasable locking means reacting between said housing and said frame for locking said housing in said position.

* * * * *